United States Patent [19]

Pethers

[11] Patent Number: 4,896,987
[45] Date of Patent: Jan. 30, 1990

[54] PIVOT JOINT

[75] Inventor: Peter C. Pethers, London, England

[73] Assignee: Trico Products Corporation, Buffalo, N.Y.

[21] Appl. No.: 323,476

[22] Filed: Mar. 14, 1989

[51] Int. Cl.⁴ ............................................. F16B 1/00
[52] U.S. Cl. ...................................... 403/24; 403/79; 15/250.42
[58] Field of Search .................. 403/79, 152, 163, 24; 15/250.32, 250.42

[56] References Cited

U.S. PATENT DOCUMENTS 4,286,351  9/1981  Mower ...................... 15/250.32 X

FOREIGN PATENT DOCUMENTS 2041730  9/1980  United Kingdom ............ 15/250.42

Primary Examiner—Andrew V. Kundrat
Attorney, Agent, or Firm—Biebel, French & Nauman

[57] ABSTRACT

A pivot joint (1) is provided for pivoting together a first member (2) and a second member (3), at least the first member (2) being of channel section at the joint (1) and the second member (3) being adapted to seat within the first member (2). The pivot joint (1) comprises a joint body (4) of generally channel section adapted to fit within the first member (2) and to receive the second member (3) therewithin, the joint body (4) having first engagement means (19, 20) located on its exterior for engagement with the first member (2) so as to secure it thereto and second engagement means (33, 34) movable between a first position in which it is adapted to cooperate with means (35, 36) on the second member (3) and a second position in which it is free of the second member (3), and a plug member (5) insertable into the channel (7) of the joint body (4) and acting on the second engagement means (35, 36) to force the second engagement means (35, 36) into its first position in which it engages the second member (3).

7 Claims, 4 Drawing Sheets

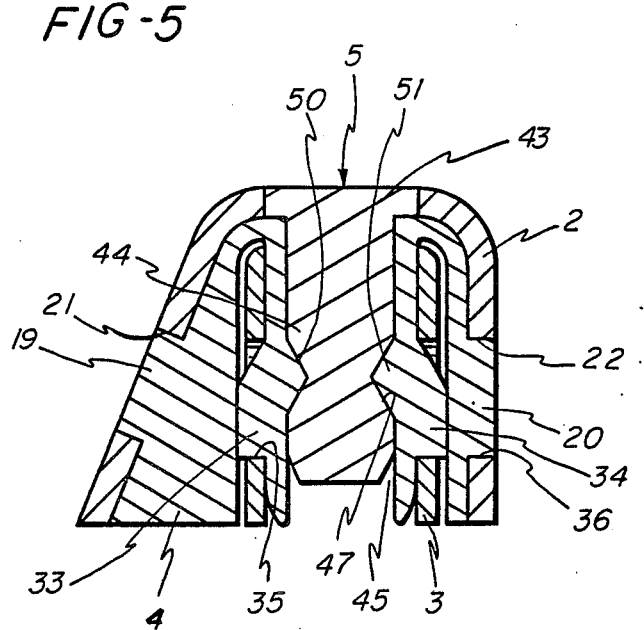

PIVOT JOINT

This invention relates to a pivot joint which is particularly, but not exclusively useful in the manufacture of windscreen wipers.

In the manufacture of windscreen wipers, a number of pivot joints are used, particularly between the various yokes and/or levers of the windscreen wiper blade harness.

Problems exist in the manufacture of windscreen wipers, due to the necessity, very often, of pivoting metal parts together. These joints tend to be noisy and have a tendency to suffer from wear and corrosion. Various proposals have been made for overcoming these problems, for example, by the provision of plastics members between the metal parts of the joints, but, while these have worked satisfactorily in use, they have not proved entirely satisfactory from a manufacturing standpoint.

The present invention seeks to provide a new and improved pivot joint which is relatively inexpensive to manufacture and use and which overcomes or reduces some or all of the above problems.

According to the invention, there is provided a pivot joint for pivoting together first and second members, at least the first of which is of channel section at the joint and the second of which is adapted to seat within the first, the pivot joint comprising a joint body of generally channel section adapted to fit within the first member and to receive the second member therewithin, the joint body having first engagement means located on its exterior for engagement with the first member so as to secure it thereto and second engagement means movable between a first position in which it is adapted to cooperate with means on the second member and a second position in which it is free of the second member, and a plug member insertable into the channel of the joint body and acting on the second engagement means to force the second engagement means into its first position in which it engages the second member.

Further according to the invention, there is provided a pivot joint comprising first and second members to be pivoted together, the first member being of channel section at least at the joint and the second member being adapted to seat within the channel section of the first member; a joint body of generally channel section adapted to sit within the first member and to receive the second member within its channel section, the joint body having first engagement means located on the exterior of the joint body andd co-operating with complementary engagement means on the first member so as to enable the first member and joint body to be secured together and second engagement means located within the channel of the joint body and movable between a first position in which the second engagement means co-operates with complimentary engagement means on the second member so as to pivotally secure the joint body and second member together and a second position in which the second engagement means is out of engagement with the complimentary means on the second member; and plug means insertable into the channel of the joint body and adapted to act on the second engagement means so as to move the second engagement means from its second position into its first position.

Preferably the first member and the joint body have corresponding apertures in their bases through which the plug can be inserted.

The first engagement means on the joint body may comprise a pair of trunnions extending from the side walls thereof and engageable in apertures in the end of the first member. The second engagement means on the joint body may comprise sprung detents which are biased in a direction away from the first position, the plug, on insertion into the channel of the joint body, engaging the detents and forcing them to take up the first position in which they are in engagement with suitable apertures in the second member.

The sprung detents may extend downwardly from the base of the channel of the joint body and the second member may be suitably apertured in its upper surface so as to permit the passage of the detents therethrough in such a way that the second member is seated between the side walls of the channel of the joint body and the depending detents.

Suitably the two members may be the yokes and/or levers of a windscreen wiper blade harness.

The invention will now be described in greater detail, by way of example, with reference to the drawings, in which:

FIG. 5 is a sectional view of the joint taken on the line IV—IV of FIG. 1.

Figure 1:
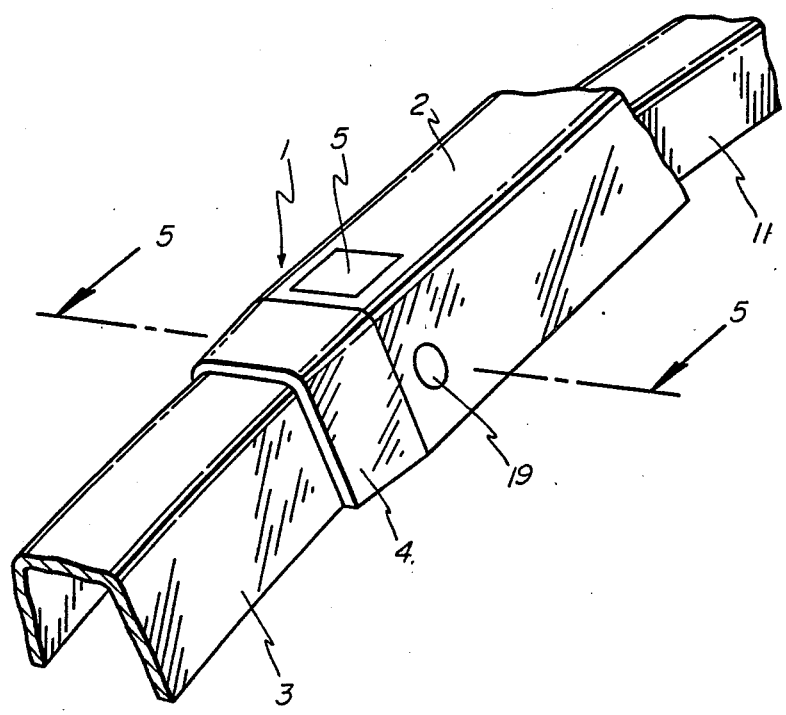
FIG. 1 is a perspective view of one form of pivot joint in accordance with the invention as applied to the joint between primary and secondary yokes of a windscreen wiper blade harness.
Figure 2:
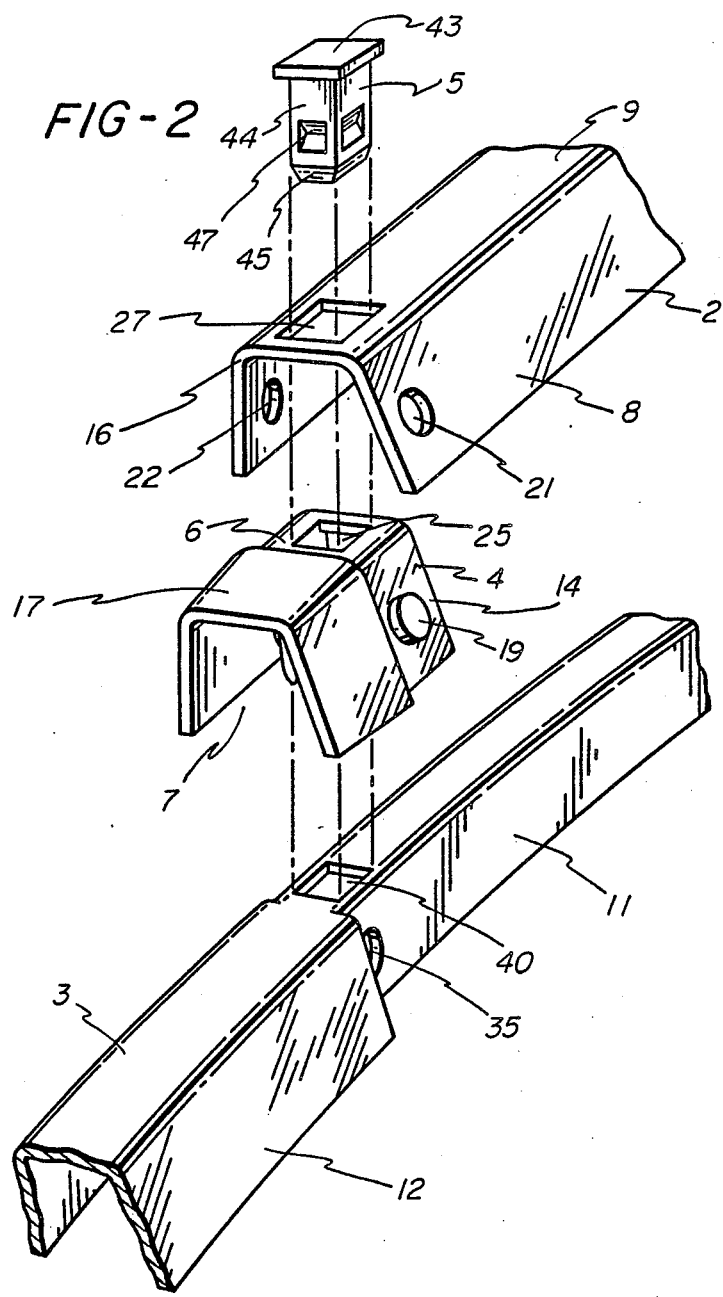
FIG. 2 is a perspective view of the joint body shown in FIG. 1.
Figure 3:
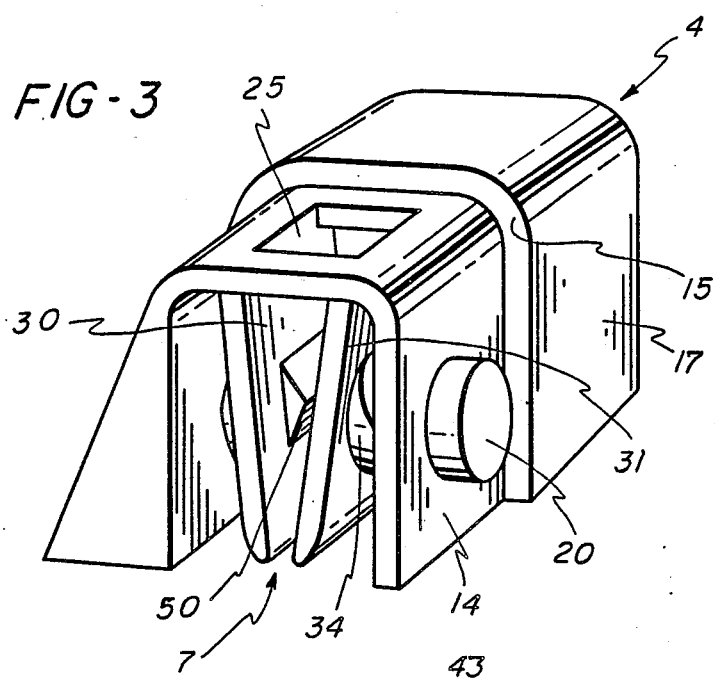
FIG. 3 is a perspective exploded view of the parts of the joint shown in FIG. 1.
Figure 4:
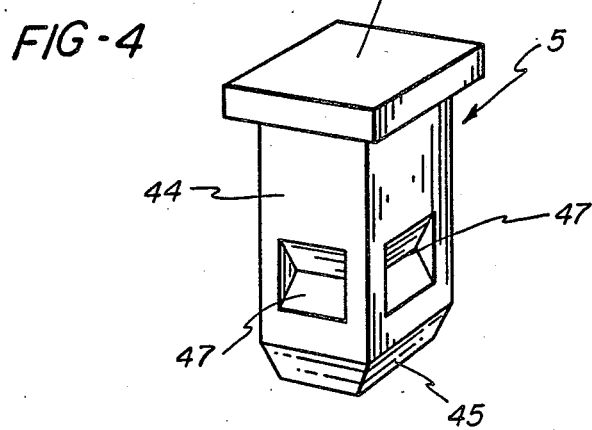
FIG. 4 is a perspective view of the plug used in the joint shown in FIG. 1.

Referring to FIG. 1 of the drawings, there is shown a pivot joint 1 between one end of the primary yoke 2 of the harness of a windscreen wiper blade and the secondary yoke 3 thereof. The joint is completed by means of a joint body 4 of suitably resilient plastics material which is situated mainly between the two yokes 2 and 3 and by a plug 5 which passes through both yokes 2 and 3 and the base 6 of the joint body 4 so as to pentrate into the channel 7 thereof for a reason to be described. In the embodiment shown, it can be seen that the primary yoke is of generally channel section having one wall 8 which is inclined outwardly from the base 9 of the channel while th remaining wall 10 (FIG. 5) is at right angles to the channel base 9. The departure of the primary yoke 2 from the usual channel section is determined by the particular characteristics of the blade which forms no part of the present invention per se. The secondary yoke 3 is of the usual channel section to one side 11 of the joint, but is of the same section as the primary yoke on the other side 12 where it forms an extension to the shape of the main yoke 2. It will be seen that the dimensions of the secondary yoke 3 are such that, at the pivot joint, it will fit within the channel of the primary yoke 2 with sufficient clearance to permit the interposition of the joint body 4. The joint body 4 can be particularly seen from FIGS. 2 and 5. It comprises a generally channel shaped plastics moulding and its shape exteriorly is such as to enable it to fit snugly inside the channel of the primary yoke 2. It has a shoulder 15 towards one end 17 against which the end 16 of the primary yoke 2 sits and which provides a cover for the joint end. The outer contour of this end portion 17 is shaped to continue the exterior surface of the primary yoke 2 into, as nearly as possible, the exterior surface of the secondary yoke 3. The remaining portion 14 is of reduced dimensions in order to seat within the channel 5 of the primary yoke 2 and exhibits a pair of trunnions 19 and 20 which are generally aligned and are inclined to each other so that, when, assembled to the primary yoke 2 they will extend at right angles to the respective side walls 8 and 10 thereof. In this position they pass ito apertures 21 and 22 in the primary yoke 2, their ends being preferably flush with the exterior surface of the primary yoke 2. Additionally the channel base 6 of the joint body 4 has a square opening 25 which passes therethrough and, this aperture 25 co-operates with a slightly larger square aperture 27 in the end of the primary yoke 2 for a purpose to be described.

Depending from the two longitudinal sides (longitudinal in respect of the yokes 2 and 3) of the aperture 25 in the joint body 4 are detents 30 and 31 which have the form of tongues with outwardly extending trunnions 33 and 34. These trunnions 33 and 34 are adapted to co-operate with apertures 35 and 36 in the side walls of the secondary yoke 3 which, in its assembled state (FIG. 5), is intended to sit within the joint body 4 so that its side walls lie between the detent tongues 30 and 31 and the actual inner surfaces of the side walls of the joint body 4. To enable this to happen, an aperture 40 is provided in the secondary yoke 3, through which the depending detents 30 and 31 can pass.

The joint is completed by means of a substantially square plug 5 which has an enlarged head portion 43 followed by a narrow operative portion 44, the end 45 of which is inclined for a purpose to be described. Each side of the plug 5 is formed with a recess 47 therein. This plug 5 is adapted to pass through the aperture 27 in th main yoke, through the aperture 25 in the joint body 4 and through the aperture 40 in the secondary yoke 3 so that it passes into the channel 7 of the joint body 4. It is to be observed that the depending detents 30 and 32 which are biased away from the associated side walls of the channel 7, are provided with further detents 50 and 51 which co-operate with the recesses 47 in the plug 5.

The assembly of the pivot joint described above will now be considered:

The primary and secondary yokes 2 and 3 are formed with appropriate apertures, the joint body 4 is moulded and the plug 5 is also formed. The first step of assembly is to push the joint body 4 into the channel of the primary yoke 2 using the enlarged part 17 as a guide. The joint body 4 is made of sufficiently resilient plastics material that, as the joint body 4 is pushed into the channel of the primary yoke 2, th sides of the joint body 4 will be forced towards each other to allow the trunnions 19 and 20 to pass into the channel of the primary yoke 2. Once the joint body has been pushed home, the side walls will spring back again introducing the trunnions 19 and 20 into the respective apertures 21 and 22 in the primary yoke. Then the secondary yoke 3 is offered up into the channel 7 of the joint body 4. To do this it is necessary for the sides of the secondary yoke 3 to pass between the spring detents 30 and 31 and the associated wall of the joint body 4. Once the detents 30 and 31 are aligned with the apertures 35 and 36 in the secondary yoke, the plug 5 is inserted in the aperture 27 in th main yoke 2 and passd through the aperture 25 in the joint body 4, through the aperture 40 in the secondary yoke 3 and into the channel of the joint body 4.

Once the plug 5 has ben pushed right home with its head 43 seated in the aperture 27 of the main yoke 2, the plug 5 will have pushed outwardly the detent tongues 30 and 31 so that the trunnions 33 and 34 enter the appropriate apertures 35 and 36 of the secondary yoke 3. The recesses 47 in the plug will receive the secondary detents 50 and 51 on the inside of the sprung detents 30 and 31 so as to lock the plug 5 in its inserted position. It will be observed that, in this position, the outer faces of the trunnions 33 and 34 will be in engagement with the inside walls of the channel 7 of the joint body, thus preventing the secondary yoke 3 becoming misaligned and lodging between the trunnions and the channel wall. With the present arrangement, this is effectively a solid trunnion arrangement stretching from one side of the joint to the other.

The joint is then completed. It is to be observed that, with the arrangements shown, the secondary yoke 3 can pivot relative to the joint body 4 which itself will remain stationary within the primary yoke 2.

It will be appreciated that various modifications may be made to the above described embodiment without departing from the scope of the invention. For example, the trunnions 19 and 20 provided on the exterior of the joint body 4 need not be of the circular shape shown but could be of any suitble shape since there is no need for any pivoting to take place between the joint body 4 and the primary yoke 2. Furthermore, the shoulder 15 on the joint body could be omitted and if necessary aligned trunnions could be used on the exterior of the joint body co-operating with suitably aligned apertures in the primary yoke so. that, if necessary, pivoting between the joint body and the main yoke 2 could be achieved. Furthermore, in the latter case, the secondary yoke 3 could then be maintained stationary with respect to the joint body, for example by using non-circular detents.

Of course, where projections or trunnions and the like have been used co-operating with suitable apertures, if desired, the projections could be formed eg. by dimpling, on the primary and/or secondary yoke, and the trunnions and other projections could be replaced by apertures.

While the plug 5 has been passed from the "upper" side of thr primary yoke 2, it will be appreciated that the plug could be inserted from the open mouth of the channel 7 in the joint body 4, thus avoiding the necessity of forming the aperture 25 in the joint body 4 and the additional aperture 27 in the primary yoke 2.

It is to be understood that while the invention has been described as applicable to a primary yoke with one side wall inclined, both side walls could be inclined or both side walls could be at right angles to the base of the channel as is the more usual. The joint could also be used between secondary and tertiary yokes or levers where such latter exist.

While the invention has been described with particular reference to the harness of a windscreen wiper blade, it is to be understood that the invention is not limited to the windscreen wiper field but may also be applied to any situation in which a similar pivot joint is required.

I claim:

1. A pivot joint for pivoting together first and second members, at least the first of which is of channel section at the joint and the second of which is adapted to seat within the first, the pivot joint comprising a joint body of generally channel section adapted to fit within the first member and to receive the second member therewithin, the joint body having first engagement means located on its exterior for engagement with the first member so as to secure it thereto and second engagement means movable between a first position in which it is adapted to cooperate with means on the second member and a second position in which it is free of the second member, and a plug member separate from said joint body and insertable into the channel of the joint body and acting on the second engagement means to force the second engagement means into its first position in which it engages the second member.

2. A pivot joint comprising first and second members to be pivoted together, the first member being of channel section at least at the joint and the second member being adaptd to seat within the channel section of the first member; a joint body of generally channel section adapted to sit within the first member and to receive the second member within its channel section, the joint body having first engagement means located on the exterior of the joint body and co-operating with complementary engagement means on the first member so as to enable the first member and joint body to be secured together and second engagement means located within the channel of the joint body and movable between a first position in which the second engagement means co-operates with complimentary engagement means on the second member so as to pivotally secure the joint body and second member together annd a second position in which the second engagement means is out of engagement with the complimentary means on the second member; and plug means separate from said joint body and insertable into the channel of the joint body and adapted to act on the second engagement means so as to move the second engagement means from its second position into its first position.

3. A pivot joint as claimed in claim 2, wherein the first member and the joint body have corresponding apertures in their bases through which the plug means can be inserted.

4. A pivot joint as claimed in claim 2, wherein the first engagement means on the joint body comprise a pair of trunnions extending from the side walls thereof and engageable in apertures in the end of the first member.

5. A pivot joint as claimed in claim 2, wherein the second engagement means on the joint body comprise detent tongues which are biased in a direction away from the first position, the plug, on insertion into the channel of the joint body, engaging the detents and forcing them to take up the first position in which they are in engagement with suitable apertures in the second member.

6. A pivot joint as claimed in claim 5, wherein the detent tongues extend downwardly from the base of the channel of the joint body and the second member is suitably apertured in its upper surface so as to permit the passage of the detents therethrough in such a way that the second member is seated between the side walls of the channel of the joint body and the depending detents.

7. A pivot joint as claimed in claim 6, wherein the members are the yokes of a windscreen wiper blade harness.

* * * * *